United States Patent [19]

Sammells

[11] Patent Number: 4,722,877
[45] Date of Patent: Feb. 2, 1988

[54] LONG CYCLE LIFE SOLID-STATE SOLID POLYMER ELECTROLYTE CELLS

[75] Inventor: Anthony F. Sammells, Naperville, Ill.

[73] Assignee: Eltron Research, Inc., Aurora, Ill.

[21] Appl. No.: 907,474

[22] Filed: Sep. 15, 1986

[51] Int. Cl.⁴ .............................................. H01M 6/18
[52] U.S. Cl. ..................................... 429/192; 429/218
[58] Field of Search ............... 429/192, 218, 193, 212, 429/213, 33

[56] References Cited

U.S. PATENT DOCUMENTS

| | | | |
|---|---|---|---|
| 4,233,377 | 11/1980 | Haering et al. | 429/218 |
| 4,303,748 | 12/1981 | Armand et al. | 429/192 |
| 4,376,709 | 3/1983 | Johnson et al. | 429/218 X |
| 4,542,009 | 9/1985 | Palmer | 429/218 X |
| 4,547,440 | 10/1985 | Hooper et al. | 429/192 X |
| 4,589,197 | 5/1986 | North | 429/192 X |

*Primary Examiner*—Anthony Skapars
*Attorney, Agent, or Firm*—Thomas W. Speckman; Ann W. Speckman

[57] ABSTRACT

Rechargeable, long cycle life solid-state galvanic cells comprising cation conducting solid polymer electrolyte contacting intercalation compound negative and positive electrodes are disclosed. Rechargeable solid-state lithium conducting solid polymer electrolyte cells utilize lithium intercalating electrodes and lithium ion conducting solid polymer electrolyte. Rechargeable solid-state sodium ion conducting solid polymer electrolyte cells utilize homogeneous matrix electrodes comprising transition metal doped beta"-alumina electrodes and sodium ion conducting solid polymer electrolyte.

22 Claims, 1 Drawing Figure

U.S. Patent
Feb. 2, 1988
4,722,877
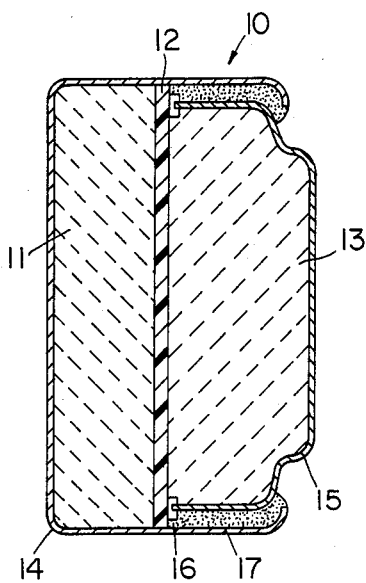

LONG CYCLE LIFE SOLID-STATE SOLID POLYMER ELECTROLYTE CELLS

This invention was made as a result of work under Contract No. ISI-8560672 awarded by the National Science Foundation. The Government has certain rights in this invention.

BACKGROUND OF THE INVENTION

1. Field of the Invention

The present invention relates to long cycle life solid-state galvanic cells comprising cation conducting solid polymer electrolytes and intercalation materials for both the positive and negative electrodes. Reduction of morphological phase changes at the electrode/electrolyte interfaces during electrochemical cycling contributes to the long cycle life and stable operation of the solid-state cell configurations of this invention.

2. Description of the Prior Art

Secondary cells utilizing essentially pure lithium as negative electrodes with lithium ion conducting non-aqueous electrolytes generally exhibit less than Faradaic cycling efficiency. Lithium electrodes are prone to undergo surface morphological changes during electrochemical cycling which lower the overall coulombic efficiency of the cell. The reduction in coulombic efficiency represents an irreversible loss in lithium capacity after each cell cycle. During cell charging, electrodeposited lithium reacts with the non-aqueous electrolyte to form an insulating film at the lithium electrode/electrolyte interface. This electrochemically deposited lithium film is non-uniform and dendritic areas develop which become electrically isolated from the lithium negative active material. During subsequent discharge, lithium particles become susceptible to mechanical removal from the electrode without contributing to the overall Faradaic charge capacity of the electrode. Lithium particles lost in this manner are generally unavailable for further cell cycling. This type of irreversible lithium loss due to morphological changes at the lithium electrode/non-aqueous electrolyte interface occurs when unit activity lithium is deposited during electrode charge. Dendrite formation is also a problem in solid-state cells utilizing lithium ion conducting solid polymer electrolytes with lithium electrodes.

The importance of intercalation compounds in solid state chemistry is known. See, e.g., M. B. Armand, "Intercalation Electrodes", *Materials for Advanced Batteries*, D. W. Murphy and J. Broadhead, eds., Nato Conference Series VI, p.145 (1979). Intercalation compounds undergo topochemical reactions involving the insertion of a guest into the intercalation compound host lattice structure with minimal structural changes by topotactic electron/ion transfer. Intercalation reactions are generally completely reversible at ambient temperatures and pressures, and therefore utilization of intercalation compounds in secondary cells is very promising.

Lithiated rutiles have been utilized as electrodes in rechargeable electrochemical cells. The topochemical lithiation of rutile related structures in non-aqueous lithium electrochemical cells is taught in D. W. Murphy et al, "Topochemical Reactions of Rutile Related Structures with Lithium", Mat. Res. Bull. 13: 1395 (1978). This article relates to the use of transition metal chalcogenides, oxides and oxyhalides as host structures suitable for use as cathodes in room temperature batteries utilizing lithium as the guest. Rutile related metal dioxides, in particular, exhibit a range of important parameters for lithium incorporation which suggest their suitability for high energy density battery applications, such as the range of size and vacancy for lithium, diffusion pathway, electronic conductivity, and crystallographic distortion.

One researcher suggests that intercalation of lithium ions may be achieved by reaction of the host lattice with a lithium/ammonia solution. R. Schollhorn, "Reversible Topotactic Redox Reactions of Solids by Electron/Ion Transfer", Angew. Chem. Int. Ed. Engl. 19: 983 (1980). This article also teaches that much experimental work has been conducted with $Li/TiS_2$ cells having a solid lithium anode and $TiS_2$ layered dichalcogenide cathode. The role of ternary phases in lithium anodes and cathodes comprising metallic halide, oxide and chalcogenide intercalation compounds is elucidated in M. S. Whittingham, "The Role of Ternary Phases in Cathode Reactions", J. Electrochem. Soc., 123: 315 (1976).

Cells have also been proposed having two intercalation electrodes, each intercalation electrode having a different lithium activity. The validity of this system was tested in lithium organic electrolyte cells comprising $Li_xWO_2$ and $Li_yTiS_2$ reversible electrodes and $LiClO_4$-PC electrolyte. M. Lazzari and B. Scrosati, "A Cyclable Lithium Organic Electrolyte Cell Based on Two Intercalation Electrodes", J. Electrochem. Soc., 127: 773 (1980).

Galvanic cells utilizing iron-doped beta-alumina cathodes are operable at closer to ambient temperatures than conventional sodium-sulfur beta-alumina systems. Cells comprising sodium negative electrodes, beta-alumina ceramic electrolyte, and sintered beta-alumina positive electrodes in which some of the aluminum sites were replaced by iron in the beta-alumina structure operated at about 120° C. were shown to be electrochemically regenerative. "Galvanic Cells Containing Cathodes of Iron-Doped Beta-Alumina", J. H. Kennedy and A. F. Sammells, J. Electrochem. Soc. 121: 1 (1974).

A variety of solid polymer electrolytes has been proposed for use in solid-state rechargeable electrochemical cells. In general, the conductivity of solid polymer electrolytes, such as poly(ethylene oxide) (PEO), is too low for ambient temperature operation, but the use of thin films and elevated temperatures of about 40° to about 120° C. increases conductivity and enhances performance for electrochemical cell applications. The feasibility of thin film polymer electrolytes for high energy density, high power density cells was demonstrated for solid-state cell configurations with lithium anodes, poly(ethylene oxide) complexed with $LiClO_4$ or $LiCF_3SO_3$ supporting electrolyte, and $TiS_2$ and $V_6O_{13}$ cathodes. M. Gauthier et al, "Assessment of Polymer-Electrolyte Batteries for EV and Ambient Temperature Applications", J. Electrochem. Soc. 132: 1333 (1985). This article teaches that cells utilizing $LiCF_3SO_3$ supporting electrolyte demonstrated poor utilization of the $TiS_2$ electrode, and required high operating temperatures and reduced current density compared to cells utilizing $LiClO_4$ supporting electrolyte.

Properties of ionic complexes of poly(ethylene oxide) (PEO) relating to their suitability for use as battery electrolytes have been investigated. Poly-ethers, specifically poly(ethylene oxide) (PEO) and poly(propylene oxide) (PPO) give adducts with selected alkali metal salts which are suitable for use as thin film solid-state electrolytes. M. B. Armand et al, "Poly-Ethers as Solid Electrolytes", *Fast Ion Transport in Solids,* Vashishta, Mundy, Shenoy, eds. (1979). This article also teaches that different polymer conductivities observed at different temperatures relate to cation size, salt concentration and crystallinity. Results of studies concerning the temperature dependence of dc conductivity of poly(ethylene oxide) complexes with sodium iodide and thiocyanates of sodium, potassium and ammonium are reported in P. V. Wright, "Electrical Conductivity in Ionic Complexes of Poly(ethylene oxide)", Br. Polym. J. 7: 319 (1975). Measurements of transference numbers for ion conducting polymers are reported in R. Dupon et al, "Transference Number Measurements for the Polymer Electrolyte Poly(ethylene oxide) NaSCN", J. Electrochem. Soc., 128: 715 (1981). The morphology of polymer crystalline structures and morphological implications for ionic conductivity are investigated in C. C. Lee and P. V. Wright, "Morphology and Ionic Conductivity of Complexes of Sodium Iodide and Sodium Thiocyanate with Poly(ethylene oxide)", Polymer, 23: 681 (1982) and D. R. Payne and P. V. Wright, "Morphology and Ionic Conductivity of Some Lithium Ion complexes with Poly(ethylene oxide)", Polymer, 23: 690 (1982).

The suitability of ionic complexes of other solid-state polymers for battery electrolytes is taught in the prior art. A variety of metal salt complexes of polyphosphazenes demonstrate good conductivity at room temperature, which suggests their suitability for room temperature thin film battery electrolyte applications. P. M. Blonsky et al, "Polyphophazene Solid Electrolytes", J.Am.Chem. Soc. 106: 6854 (1984). Conductive poly(vinyl acetate) complexes are taught in M. C. Wintersgill et al, "Electrically Conducting Poly(Vinyl Acetate)", J.Electrochem. Soc. 131: 2208 (1984). Preparation of conductive solid electrolyte complexes of poly(ethylene succinate) is described in R. Dupon et al, "Ion Transport in the Polymer Electrolytes Formed Between Poly(ethylene succinate) and Lithium Tetrafluoroborate", J.Electrochem. Soc. 131: 586 (1984). Rechargeable organic batteries utilizing thin films of polyacetylene reversibly electrochemically doped to give a series of organic metals as negative and/or positive active material and liquid non-aqueous electrolytes are taught in D. MacInnes, Jr., et al, "Organic Batteries: Reversible n- and p- Type Electrochemical Doping of Polyacetylene, $(CH)_x$", J. Chem. Soc., Chem. Commun., p.317 (1981).

SUMMARY OF THE INVENTION

It is an object of the present invention to provide a long cycle life solid-state galvanic cell comprising cation conducting solid polymer electrolyte and intercalation compounds for both the positive and negative electrodes.

It is another object of the present invention to provide a long cycle life solid-state cell which demonstrates reduced coulombic efficiency losses associated with surface morphological changes at both the negative and positive electrodes.

It is another object of the present invention to provide rechargeable long cycle life solid-state lithium conducting solid polymer electrolyte cells utilizing lithium intercalating electrodes and lithium ion conducting solid polymer electrolyte, which maintain high coulombic efficiencies during extended electrochemical cell cycling.

It is yet another object of the present invention to provide rechargeable long cycle life solid-state sodium ion conducting solid polymer electrolyte cells utilizing homogeneous matrix electrodes comprising transition metal doped beta''-alumina electrodes and sodium ion conducting solid polymer electrolyte, which maintain high coulombic efficiencies during extended electrochemical cell cycling.

It is still another object of the present invention to provide long cycle life solid-state cells wherein the electrode/solid polymer electrolyte interfaces remain morphologically invarient during extended cell cycling.

The long cycle life solid-state cell of the present invention utilizes a cation conducting solid polymer electrolyte and intercalation compounds for both the positive and negative electrodes. Several specific cell configurations are disclosed, utilizing either lithium ion conducting solid polymer electrolyte complexes with lithium intercalating electrodes, or sodium ion conducting solid polymer electrolyte complexes with sodium intercalating electrodes comprising homogeneous matrix transition metal doped beta''-alumina compounds.

Lithium intercalating compounds suitable for use as negative electrodes in solid-state lithium conducting solid polymer electrolyte cells of the present invention may comprise rutile metal oxides of the general composition $MO_2$, where M=Mo, Ru, W, Os, Ir, and $Mo_{\frac{1}{2}}V_{\frac{1}{2}}$. Tungsten dioxide ($WO_2$) is an especially preferred intercalation compound which can be readily intercalated to form a compound having an approximate stoichiometry $Li_xWO_2$, where $0.1<X<1.0$. Lithium intercalation of the negative electrode may be achieved either electrochemically or via direct chemical reaction. Although the non-stoichiometric lithium intercalation compounds exhibit some electronic conductivity, a current collector having high electronic conductivity comprising Nichrome wire, copper, aluminum, and the like is preferably provided contacting the negative electrode. Suitable positive electrodes, such as transition metal chalcogenides, oxides, oxyhalides, and the like are known to the art. $TiS_2$ is an especially preferred lithium intercalating positive electrode compound. A current collector having high electronic conductivity comprising Nichrome wire, copper, aluminum and the like, is preferably provided contacting the positive electrode.

A rechargeable solid-state lithium conducting solid polymer electrolyte cell, according to the present invention, utilizes lithium ion conducting solid polymer electrolytes. Suitable lithium ion conducting solid polymer electrolytes generally comprise a polymer complexed with a lithium ion conducting supporting electrolyte. Poly(ethylene oxide), poly(ethylene oxide)/poly(ethylene glycol) mixtures, and polyphosphazene polymers complexed with $LiCF_3SO_3$ supporting electrolyte are especially preferred lithium ion conducting solid polymer electrolyte complexes.

Sodium intercalating compounds suitable for use as electrodes in solid-state sodium ion conducting solid polymer electrolyte cells of the present invention preferably comprise homogeneous matrix electrodes based upon transition metal ion doped sodium ion conducting electrolyte beta''-alumina. Beta''-alumina material may be converted into electrochemically reversible electrodes by the incorporation of transition metals into immobile $Al^{3+}$ lattice sites located within the solid electrolyte bulk. Any combination of transition metal redox species which can be incorporated into beta"-alumina structure and provides sufficiently separated electrode potentials to give cells with usable voltages is suitable for use in the present invention. The transition metal ion doped beta"-alumina-based electrode materials possess both ionic and electronic conductivity. Beta"-alumina electrode materials for use in cells of the present invention preferably utilize the respective magnesium and lithium stabilized materials possessing the initial nominal compositions $Na_{1.66}Mg_{0.67}Al_{10.33}O_{17}$ and $Na_{1.68}Li_{0.32}Al_{10.41}O_{18}$. After synthesis of the above materials doped with transition metals they possess the respective general compositions $Na_{1.66}Mg_{0.67}Al_{10.33-y}M_yO_{17}$ for the positive electrode material and $Na_{1.68}Li_{0.32}Al_{10.41-y}M_yO_{18}$, or $Na_{1.81}Li_{0.32}Al_{10.33-y}M_yO_{18}$ for the negative electrode material, where M may be either $Cr^{2+}$ or $Fe^{3+}$ in a fully charged cell and where y is from about 0.1 to about 0.65, preferably from about 0.4 to 0.5.

A rechargeable solid-state sodium ion conducting solid polymer electrolyte cell, according to the present invention, utilizes sodium ion conducting solid polymer electrolytes. Suitable sodium ion conducting solid polymer electrolyte complexes generally comprise a polymer complexed with a sodium ion conducting supporting electrolyte. Poly(ethylene oxide), poly(ethylene oxide)/poly(ethylene glycol) mixtures, and polyphosphazene polymers complexed with $NaCF_3SO_3$ supporting electrolyte are especially preferred.

Unlike cells utilizing the lithium intercalation negative electrodes disclosed above, no change in oxidation state by the mobile alkali ion occurs upon transport across the electrode/solid polymer electrolyte interface during cycling. In solid-state sodium ion conducting solid polymer electrolyte cells, changes in electrochemical potential occur via redox electrochemistry involving the immobile transition metal species present in the homogeneous matrix solid-state lattice.

During electrochemical cycling, electroneutrality within a given solid-state lattice is maintained by the appropriate migration into (during reduction) or out of (during oxidation) the lattice by the mobile sodium ions via the solid polymer electrolyte. This is feasible since the beta"-alumina structure accommodates a population of sodium ions above that nominally required to maintain acceptable ionic conductivity. The beta"-alumina based electrodes possess both electronic and ionic conductivity and consequently high Faradaic efficiency is obtained. Overall electrode capacity is in part dictated by the population of transition metal species present and the excess population of mobile sodium ions present within the lattice structure above that necessary to maintain acceptable ionic conductivity within the cell.

According to a preferred embodiment of the present invention, the solid-state solid polymer electrolyte cell is hermetically sealed from the atmosphere and may be operated at temperatures of from about 30° C. to about 120° C.

BRIEF DESCRIPTION OF THE DRAWING

Further features of the invention will be apparent from the following more detailed description read in conjunction with the drawing, which shows a schematic sectional view of a sealed solid-state solid polymer electrolyte cell according to the present invention.

DESCRIPTION OF PREFERRED EMBODIMENTS

Solid-state electrochemical cells utilizing cation conducting solid polymer electrolytes and intercalation materials for both positive and negative electrodes are disclosed. Solid-state lithium conducting solid polymer electrolyte cells comprise lithium ion conducting solid polymer electrolyte complexes with lithium intercalation compound positive and negative electrodes. Solid-state sodium ion conducting solid polymer electrolyte cells comprise sodium ion conducting solid polymer electrolyte complexes with homogeneous matrix electrodes comprising transition metal ion doped beta"-alumina.

Suitable lithium intercalating compounds for use as negative electrodes for solid-state lithium conducting solid polymer electrolyte cells according to this invention include, but are not limited to rutiles having the general formula $MO_2$, where M=Mo, Ru, W, Os, Ir and $Mo_{\frac{1}{2}}V_{\frac{1}{2}}$. Crystallographic parameters for suitable rutile metal oxides in both the lithiated and unlithiated condition are as follows:

TABLE I

Crystallographic Parameters of Interest for Selected Rutiles and Lithiated Rutiles

| | a(Å) | C(Å) | c/a | V(Å)$^3$ | Δ V/v | Decomposition Temperature (°C.) |
|---|---|---|---|---|---|---|
| $MoO_2$ | 4.82 | 2.80 | 0.581 | 65.05 | | |
| $Li_{1.0}MoO_2$ | 5.13 | 2.78 | 0.542 | 73.16 | 0.125 | 210 |
| $RuO_2$ | 4.491 | 3.106 | 0.692 | 62.64 | | |
| $Li_{1.3}RuO_2$ | 5.043 | 2.784 | 0.552 | 70.80 | 0.130 | 210 |
| $WO_2$(c) | 4.88 | 2.78 | 0.570 | 66.20 | | |
| $Li_{1.0}WO_2$ | 5.16 | 2.75 | 0.533 | 73.22 | 0.106 | 80 |
| $OsO_2$ | 4.497 | 3.182 | 0.708 | 64.36 | | |
| $Li_{1.5}OsO_2$ | 5.162 | 2.795 | 0.541 | 74.45 | 0.157 | |
| $IrO_2$ | 4.499 | 3.155 | 0.701 | 63.85 | | |
| $Li_{1.5}IrO_2$ | 4.873 | 3.190 | 0.655 | 75.75 | 0.186 | >80 |
| $Mo_{\frac{1}{2}}V_{\frac{1}{2}}O_2$ | 4.64 | 2.86 | 0.616 | 61.66 | | |
| $Li_{1.0}Mo_{\frac{1}{2}}V_{\frac{1}{2}}O_2$ | 5.06 | 2.79 | 0.551 | 71.43 | 0.158 | 130 |

Other lithium intercalating compounds with similar crystallographic parameters may also be adapted for use in the present invention. Tungsten dioxide ($WO_2$) is especially preferred for use as the negative electrode, since it is readily electrochemically intercalated to a lithiated compound having the approximate stoichiometry $Li_{0.1}WO_2$ to about $Li_{0.9}WO_2$. Tungsten dioxide intercalates at a potential of approximately 0.5 V positive of lithium, and is electrochemically reversible to lithium intercalation. The negative electrode preferably comprises a tungsten dioxide disc, or a dispersion of tungsten dioxide with PEO or with graphite and PEO or with Teflon pressed and cured to form a monolithic assembly. Dispersions of tungsten dioxide comprising 5–10 w/o PEO or 10 w/o graphite and 5 w/o PEO, or 5 w/o Teflon are especially preferred. Utilization of a $WO_2$ dispersion increases the available surface area at the negative electrode to effect lithium intercalation during initial cell charge.

Suitable lithium intercalating compounds for use as positive electrodes in solid-state lithium conducting solid polymer electrolyte cells according to this invention include $TiS_2$; $ZrS_2$; $ZrSe_2$; $VSe_2$; $V_2S_5$; $Fe_{0.25}V_{0.75}S_2$; $Cr_{0.75}V_{0.25}S_2$; $Cr_{0.5}V_{0.5}S_2$; $NbS_3$; $NiPS_3$; $FeOCl$; $UO_2F_2$; $NbSe_3$; $MoS_3$; $CuS$; $Cr_3O_8$; $V_6O_{13}$ (stoichiometric); $V_6O_{13}$ (non-stoichiometric); $TaS_2$; $MoS_2$;

MoSe$_2$ WS$_2$; WSe$_2$ and other lithium intercalating compounds having similar properties. Positive lithium intercalation electrodes comprising the transition metal dichalcogenide TiS$_2$ are especially preferred. In a preferred embodiment, the positive electrode comprises a dispersion of Li$_x$TiS$_2$ with PEO, or with graphite and PEO, or with a Teflon/graphitized carbon mixture which is initially pressed and then cured. Dispersions of TiS$_2$ comprising 5–10 w/o PEO or 10 w/o graphite and 5 w/o PEO or 25 w/o Teflon/graphitized carbon in a 2:1 weight ratio are especially preferred. Utilization of a dispersion is preferred for many applications since it promotes maintenance of adequate ionic and electronic conductivity within the positive electrode, thereby increasing Faradaic efficiency.

Lithium ion conducting solid polymer electrolyte is provided contacting both the negative and positive electrodes. Lithium ion conducting solid polymer electrolytes comprise a polymer complexed with a lithium ion conducting supporting electrolyte preferably dissolved in a non-aqueous solvent. Suitable polymers for use in the present invention include poly(ethylene oxide), poly(ethylene oxide) (PEO)/poly(ethylene glycol) (PEG) mixtures, polyphosphazene, and the like. Suitable lithium ion conducting supporting electrolytes include LiCF$_3$SO$_3$; LiAsF$_6$; LiClO$_4$; LiAlCl$_4$; LiGaCl$_4$; LiBF$_4$; LiCl; and other supporting electrolytes having similar properties and are preferably dissolved in a non-aqueous solvent such as acetonitrile. In a preferred embodiment, solid polymer PEO containing electrolytes are prepared using an acetonitrile solution of the desired lithium conducting supporting electrolyte, the acetonitrile being removed by evaporation. A monomer repeat unit/alkali metal salt ratio of 4.5:1 in solid polymer PEO containing electrolytes is preferred. For solid polymer electrolytes containing mixtures of PEO and PEG, a PEO:PEG monomer ratio of 3.2:4.8 is preferred, with an 8:1 monomer repeat unit:alkali metal salt ratio. According to another preferred embodiment, purified poly [bis(2-(2-methoxyethoxy)ethoxy)phosphazene], commonly referred to as polyphosphazene, solid polymer electrolytes are prepared by introducing the desired lithium conducting supporting electrolyte in an acetonitrile solution, with subsequent removal of acetonitrile by evaporation to achieve an 8:1 monomer repeat unit/alkali metal salt ratio.

Suitable sodium intercalating compounds for use as electrodes for solid-state sodium ion conducting solid polymer electrolyte cells according to this invention comprise homogeneous matrix electrode material in the form of transition metal ion doped beta″-alumina compounds. Any combination of transition metal redox species which can be incorporated into the beta″-alumina lattice structure and provides sufficiently separated electrode potentials is suitable for use in the homogeneous matrix electrode material of the present invention. Sodium beta″-alumina based electrode materials utilize the respective magnesium and lithium stabilized materials possessing the initial nominal compositions Na$_{1.66}$Mg$_{0.67}$Al$_{10.33}$O$_{17}$ and Na$_{1.68}$Li$_{0.32}$Al$_{10.41}$O$_{18}$. After doping of the above materials with transition metals they possess the respective general compositions Na$_{1.66}$Mg$_{0.67}$Al$_{10.33-y}$M$_y$O$_{17}$ for the positive electrode material and Na$_{1.68}$Li$_{0.32}$Al$_{10.41-y}$M$_y$O$_{18}$ or Na$_{1.81}$Li$_{0.32}$Al$_{10.33-y}$M$_y$O$_{18}$ for the negative electrode material where M is preferably Cr$^{2+}$ or Fe$^{3+}$ in a fully charged cell and y is from about 0.1 to about 0.65 and preferably from about 0.4 to 0.5.

Especially preferred homogeneous matrix beta″-alumina electrodes comprise Na$_{1.66}$Mg$_{0.67}$Al$_{10.33-y}$Fe$_y$O$_{17}$ containing 24.8 and 37.7 m/o Fe$_2$O$_3$ introduced into the beta″-alumina structure for the positive electrode and Na$_{1.81}$Li$_{0.32}$Al$_{10.4-y}$Cr$_y$O$_{18}$ *contianing* 45 m/o Cr$_2$O$_3$ for the negative electrode. These homogeneous electrode matrix materials may be prepared by heating stoichiometric amounts of the appropriate metal oxides at about 1000°–1500° C. to effect direct solid-state reactions. In a preferred embodiment, the homogeneous matrix electrode materials may be dispersed with graphite and solid polymer electrolyte followed by pressing and curing to increase the available electroactive surface for cell cycling.

Sodium ion conducting solid polymer electrolyte is provided contacting both the negative and positive electrodes. Sodium ion conducting solid polymer electrolyte complexes comprise a polymer complexed with a sodium ion conducting supporting electrolyte preferably dissolved in a non-aqueous solvent. Suitable polymers for use in the present invention comprise poly(ethylene oxide), poly(ethylene oxide)(PEO)/poly(ethylene glycol) (PEG) mixtures, polyphosphazene, and the like. Suitable sodium ion conducting supporting electrolytes include NaCF$_3$SO$_3$, NaAlCl$_4$, NaClO$_4$, and other alkali metal salts having similar properties, and are preferably dissolved in a non-aqueous solvent such as acetonitrile. In a preferred embodiment, solid polymer PEO containing electrolytes are prepared using an acetonitrile solution of the desired sodium ion conducting supporting electrolyte, with subsequent removal of acetonitrile by evaporation to achieve a monomer repeat unit/alkali metal salt ratio of 4.5:1. For solid polymer electrolytes containing mixtures of PEO and PEG, a PEO:PEG monomer ratio of 3.2:4.8 is preferred, with an 8:1 monomer repeat unit:alkali metal salt ratio. According to another preferred embodiment, purified polyphosphazene containing solid polymer electrolytes are prepared by introducing the desired sodium ion conducting supporting electrolyte in an acetonitrile solution, and removing acetonitrile by evaporation to provide an 8:1 monomer repeat unit:alkali metal salt ratio.

Specific solid-state cell configurations preferred for use in the present invention include:

Li$_x$WO$_2$/PEO,LiCF$_3$SO$_3$/TiS$_2$

Li$_x$WO$_2$/PEO,PEG,LiCF$_3$SO$_3$/TiS$_2$

Li$_x$WO$_2$/polyphosphazene,LiCF$_3$SO$_3$/TiS$_2$

Na$_{1.81}$Li$_{0.32}$Al$_{10.33-y}$Cr$_y$O$_{18}$/Polyphosphazene,NaCF$_3$SO$_3$/Na$_{1.66}$Mg$_{0.67}$Al$_{10.33-y}$Fe$_y$O$_{17}$ Na$_{1.81}$Li$_{0.32}$Al$_{10.33-y}$Cr$_y$O$_{18}$/PEO,NaCF$_3$SO$_3$/Na$_{1.66}$Mg$_{0.67}$Al$_{10.33-y}$Fe$_y$O$_{17}$ Na$_{1.81}$Li$_{0.32}$Al$_{10.33-y}$Cr$_y$O$_{18}$/PEO,PEG,NaCF$_3$SO$_3$/Na$_{1.66}$Mg$_{0.67}$Al$_{10.33-y}$Fe$_y$O$_{17}$ The FIGURE illustrates a schematic diagram of one preferred embodiment of a solid-state solid polymer electrolyte cell according to the present invention. Solid-state cell 10 comprises positive active material 11 and negative active material 13 separated by solid polymer electrolyte 12. This arrangement is applicable to both lithium-based and sodium-based solid-state cells described above. Cathode housing 14 and anode housing 15 confine the respective positive and negative active material, provide current collection, and are separated from one another by insulator 17. Anode housing 15, as shown, terminates at each end in insulating gaskets 16. Solid-state cell 10 is preferably hermetically sealed. The solid-state cells of the present invention may be adapted to many other suitable solid-state cell configurations.

A plurality of solid-state cells may be assembled to provide a high power and high energy density rechargeable battery for applications such as utility load leveling, reversible storage devices for electronic and electrochromic displays, in implanted biomedical applications, and reversible power sources in specialized aerospace applications. Cells of this type are preferably hermetically sealed from direct contact with the atmosphere, and are preferably operated at temperatures from about 30° to about 120° C. Initial cell voltages fo the cells disclosed above are generally about 1.0 to 2.0 V and the cells can be electrochemically cycled with current densities from about 0.1 to about 10 mA/cm$^2$.

The following examples set forth specific cell components and their methods of manufacture and specific cell configurations, for the purpose of more fully understanding preferred embodiments of the present invention and are not intended to limit the invention in any way.

EXAMPLE I

A solid-state lithium conducting solid polymer electrolyte electrochemical cell having the configuration: $Li_xWO_2/PEO,LiCF_3SO_3/TiS_2$ was assembled for testing.

Tungsten dioxide was initially ground in an alumina ball mill using methylene chloride as a grinding aid until the average $WO_2$ particle size was between 2 and 3 microns. At this stage, 5 w/o of Teflon was introduced as an aqueous Teflon 30B mixture to the $WO_2$ powder and thoroughly mixed. Water was removed by heating at about 100° C. in the atmosphere. Pellets possessing thicknesses of between 0.5 and 2 mm were obtained after pressing the $WO_2$/Teflon mixture in a KBr type die at 20,000 psi. Sintering of the Teflon particles within the pressed composites was accomplished by heating at 225° C. under argon for two hours. The $WO_2$ pellets obtained in this manner possessed good integrity and high electronic conductivity. A current collector comprising Nichrome wire was attached to one edge of the $WO_2$ pellet using graphoxy cement (Dylon Industries grade Px). The graphoxy cement was cured by heating the electrode assembly at 180° C. under argon for one hour. Lithium intercalation was achieved by cathodically depositing lithium under constant current conditions at 0.1 mA/cm$^2$ until the desired degree of lithium intercalation was achieved. Alternatively, lithium intercalation may be achieved by direct chemical intercalation of the $WO_2$ electrode by immersion in a solvated electron lithium solution.

$TiS_2$ positive electrodes were prepared containing 25 w/o of a Teflon/graphitized carbon mixture in a 2:1 weight ratio. An aqueous suspension of Teflon 30B was mixed with graphizied carbon. Water was removed by heating at 90° C. followed by sintering at 225° C. under argon to promote Teflon curing. The Teflon/carbon mixture was mixed with the stoichiometric amount of $TiS_2$ powder using acetonitrile as a mixing agent. After removing acetonitrile at 60° C., $TiS_2$ pellets were pressed in a KBr type die at 20,000 psi. This positive electroactive material was compatible at this stage for incorporation into solid-state solid polymer electrolyte cells.

PEO solid electrolyte was prepared using an acetonitrile solution of PEO (m.w. 600,000) and the lithium conducting salt $LiCF_3SO_3$ in the monomer repeat unit-:alkali metal salt ratio of 4.5:1. A film of this polymer was initially cast from acetonitrile solution onto a Teflon block, followed by being cured under vacuum at 80° C. The resulting lithium ion conducting solid polymer electrolyte film was readily removable from the Teflon block by peeling. Cells were assembled by introducing the acetonitrile/solid polymer electrolyte solution onto the $Li_xWO_2$ electrode. All procedures at this stage were performed under argon. After the partial removal of acetonitrile by evaporation, the cured PEO film was placed onto one of the electrodes. This was followed by lightly pressing both half-cells together. The cell was then cured again under vacuum at 80° C. in the electrochemical assembly used for cell testing. This procedure was found effective for ensuring electronic separation between the two half-cells.

For a cell of the configuration $Li_{0.85}WO_2/LiCF_3SO_3$, $PEO/TiS_2$, the open circuit potential was 2.1 V at 88° C. under vacuum and current densities of 90 $\mu A/cm^2$ could be realized at 1.7 V. The cell possessed relatively high resistances as a result of the solid polymer electrolyte thickness (about 0.1 mm) within the interelectrode spacing. The cell was completely electrochemically reversible.

EXAMPLE II

A solid-state lithium conducting solid polymer electrolyte cell having the configuration $Li_xWO_2/LiCF_3SO_3$, PEO, PEG/$TiS_2$ was assembled for testing. The electrodes and solid polymer electrolyte were prepared as described in Example I. A PEO:PEG monomer ratio of 3.2:4.8 was utilized, with an 8:1 ratio of monomer repeat unit:alkali metal salt.

For a cell of the configuration $Li_{0.8}WO_2/LiCF_3SO_3$, PEO, PEG/$TiS_2$, the open circuit potential was 2.23 V at 80° C. and current densities of 90 $\mu A/cm^2$ were realized at 1.7 V. This cell possessed a lower overall cell resistance than the cell described in Example I. The cell was completely electrochemically reversible.

EXAMPLE III

A solid-state lithium conducting solid polymer electrolyte cell having the configuration $Li_xWO_2/LiCF_3SO_3$, polyphosphazene/$TiS_2$ was assembled for testing. The electrodes were prepared as described in Example I.

Poly[bis(2-(2-methoxyethoxy)ethoxy)phosphazene] material was prepared according to a known procedure in the following series of steps:

(i) Purification of phosphonitrilic chloride trimer $(NPCl_2)_3$

Phosphonitrilic chloride trimer $(NPCl_2)_3$ obtained from Aldrich Chemical Co. was initially decolorized with activated carbon followed by being recrystallized twice from n-heptane at about 50° C. The first crop of crystals from the second recrystallization was filtered off and dried under vacuum at room temperature.

(ii) $(NPCl_2)_3$ polymerization

The recrystallized $(NPCl_2)_3$ was placed in a Schlenk tube, connected to a vacuum line and evacuated for two hours at about $5 \times 10^{-5}$ mm Hg. The Schlenk tube was then isolated from the vacuum line and wrapped with heating tape. This was then heated at 250° C. for two days followed by cooling to room temperature. The resulting polymer was broken into small pieces in a glove bag (under argon) and transferred to 250 ml of dry benzene. This solution was filtered to remove any residual solids. The poly(dichlorophosphazene) was isolated from benzene by addition of n-heptane and filtered, followed by washing with n-heptane and storing under vacuum.

(iii) poly[bis(2-(2-methoxyethoxy)ethoxy)phosphazene]

A solution of poly(dichlorophosphazene) 5 g (0.0425 mole) in THF (100 ml) was added over 20 minutes to a stirred suspension of sodium 2-(2-methoxyethoxy)ethoxide. This latter compound was initally prepared by mixing sodium spheres (1.96 g, 0.85 moles) and 2-(2-methoxyethoxy)ethanol in 100 ml of THF at 50° C. The poly(dichlorophosphazene) and sodium 2-(2-methoxyethoxy)ethoxide reaction mixture was then refluxed for 24 hours. The resulting poly(bis(2-(2-methoxyethoxy(ethoxy)phosphazene] was isolated by precipitation from heptane.

(iv) poly[bis(2-(2-methoxyethoxy)ethoxy)phosphazene]

The impure polymer was initially purified by dialysis against water for seven days. The polymer solution was then filtered and the solvent removed by evaporation. Removal of residual salts was performed by successive passage through Dowex 5W$-$X10 (H$^+$ form) and 1$-$X8 (OH$^-$) columns.

Solid polymer electrolytes from the above purified polyphosphazene were obtained by introducing LiCF$_3$SO$_3$ in an 8:1 mole ratio of monomer to salt in an acetonitrile solution. The polymer was cast onto a Teflon block followed by removing the remaining solvent under vacuum at ambient temperature. The polymeric film could be readily peeled from the Teflon block. Cells were prepared by initially placing some solid polymer electrolyte solvent solution onto each electrode, followed by partial solvent evaporation until the surface became tacky. The cast polymer film was then placed between the two half-cells and the cell lightly pressed together. All procedures at this stage were performed under an argon atmosphere. Cells were then brought to operating temperature under vacuum.

For a cell of the configuration Li$_{0.8}$WO$_2$/LiCF$_3$SO$_3$, polyphosphazene/TiS$_2$, the open circuit potential was 2.18 V at 90° C. and current densities of 100 $\mu$A/cm$^2$ could be realized at 2.1 V. Cells prepared using polyphosphazene generally possessed lower resistances than their PEO containing analogs and possessed excellent electrochemical reversibility.

EXAMPLE IV

Solid-state sodium ion conducting solid polymer electrolyte cells having the following configurations were assembled for testing:
Na$_{1.81}$Li$_{0.32}$Al$_{10.33-y}$Cr$_y$O$_{18}$/PEO,NaCF$_3$SO$_3$/-Na$_{1.66}$Mg$_{0.67}$Al$_{10.33-y}$Fe$_y$O$_{17}$
Na$_{1.81}$Li$_{0.32}$Al$_{10.33-y}$Cr$_y$O$_{18}$/PEO,PEG,NaCF$_3$SO$_3$/-Na$_{1.66}$Mg$_{0.67}$Al$_{10.33-y}$Fe$_y$O$_{17}$
Na$_{1.81}$Li$_{0.32}$Al$_{10.33-y}$Cr$_y$O$_{18}$/polyphosphazene,NaCF$_3$/SO$_3$/Na$_{1.66}$Mg$_{0.67}$Al$_{10.33-y}$Fe$_y$O$_{17}$ The solid polymer electrolytes were prepared as described in Examples I-III, substituting NaCF$_3$SO$_3$ for LiCF$_3$SO$_3$.

Initial preparation of transition metal doped beta"-alumina powders was achieved by introducing into an alumina ball mill appropriate amounts of the materials Al$_2$O$_3$, MgO (or Li$_2$CO$_3$), Na$_2$CO$_3$ and the desired transition metal oxide. These materials were ground until the average particle size of the intimate mixture was between 2 and 3 microns. Methylene chloride was used as a grinding aid. This mixture was then heated to about 1000° C. for several hours in an alumina boat exposed to the atmosphere until completion of solid-state reaction was evident. At this stage two strategies were pursued towards electrode fabrication. In the first approach the reacted solid-state powder was reintroduced into the ball mill together with about 2 $^w$/o of the binding agent carbowax 1000 as a 10 $^w$/o aqueous solution and reground. After initially removing water at 90° C., this reground material was then pressed into pellets at 20,000 psi using a KBr type die. These pellets were slowly heated to 200° C. in the atmosphere to remove the binder followed by sintering at temperatures around 1000° C. In the second approach, the powder obtained from the initial solid-state reaction procedure was mixed with an acetonitrile solution of the appropriate solid polymer electrolyte, NaCF$_3$SO$_3$ and graphitized carbon. After acetonitrile removal at 60° C., the final material contained 10 $^w$/o solid polymer electrolyte and 10 $^w$/o carbon. This material was then pressed into electrode pellets in a KBr die using lower pressures. The second approach for preparing beta"-alumina electrodes is preferred.

Beta"-alumina cells were prepared in the discharged state, where Fe$^{3+}$ species present in the lattice after the solid-state synthesis step were reduced to Fe$^{2+}$ by heating at 1000° C. under a 10 percent H$_2$, 90 percent N$_2$ mixture, prior to mixing with the solid polymer electrolyte and carbon. These beta"-alumina composites contained 40 and 55 $^m$/o of FeO, respectively. Because of the desiccant qualities of the beta"-alumina materials, all procedures after electrode fabrication were performed under inert atmosphere conditions.

For the cell:
45$^m$/o Cr$_2$O$_3$ in beta"alumina/NaCF$_3$SO$_3$,PEO/40 $^m$/o FeO in beta"-alumina
the initial open circuit potential was, as expected, close to zero. This cell operating at 88° C. possessed a resistance of 2.5 k $\Omega$ and could pass charging currents of 65 $\mu$A/cm$^2$ at a total cell polarization of 0.1 V. Cells were initially charged at 20 $\mu$A/cm$^2$ for 15 hours to give a total charged capacity of 0.3 mAh/cm$^2$. These cells were capable of accepting considerably more charge. These cells possessed good electrochemical reversibility.

For the cell:
45 $^m$/o Cr$_2$O$_3$ in beta"-alumina/NaCF$_3$SO$_3$, PEO,-PEG/55 $^m$/o FeO in beta"-alumina
a cell resistance of 650 $\Omega$ was found. After the passage of 0.54 mAh/cm$^2$ at 30 $\mu$A/cm$^2$ the cell voltage became 1.04 V. In general, this cell demonstrated higher electrochemical stability than solid-state cells described above containing PEO solid polymer electrolyte.

For the cell:
45 $^m$/o Cr$_2$O$_3$ in beta"-alumina/NaCF$_3$SO$_3$,polyphosphazene/55 $^m$/o FeO in beta"-alumina
charging currents of 50 $\mu$A/cm$^2$ were realized at a total cell polarization loss of 0.2 V. The cell had a total resistance of 400 $\Omega$ which for the estimated 0.1 mm solid polymer electrolyte thickness was the lowest value found for any of the beta"-alumina solid polymer electrolyte cells. After the passage of 0.3 mAh/cm$^2$ of charge at 20 $\mu$A/cm$^2$ the cell possessed an open-circuit potential of 1.17 V.

In conclusion, excellent electrochemical reversibility was found for solid-state cells based upon transition metal doped beta"-alumina as electrode materials. Preparation of cells in the discharged state had the added advantage that $Cr^{2+}$ species formed during cell charge would in part be protected from exposure to stray contaminants in the cell test environment due to a solid polymer electrolyte coating surrounding each chromium doped beta"-alumina particle. It is expected that hermetically sealed cells will be capable of extremely long cycle lifetimes.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A rechargeable solid-state lithium conducting solid polymer electrolyte electrochemical cell comprising:

a lithium intercalation compound negative electrode selected from the group consisting of: $MoO_2$; $RuO_2$; WO; $OsO_2$; $IrO_2$; and $Mo_{\frac{1}{2}}V_{\frac{1}{2}}O_2$;

a lithium ion conducting solid polymer electrolyte comprising a lithium ion conducting supporting electrolyte complexed with a solid polymer contacting said negative electrode on one side; and a lithium intercalation compound positive electrode contacting the opposite side of said solid polymer electrolyte.

2. A rechargeable solid-state lithium conducting solid polymer electrolyte electrochemical cell according to claim 1 wherein said lithium intercalation compound positive electrode is selected from the group consisting of: $TiS_2$; $ZrS_2$; $ZrSe_{2a}$; $VSe_2$; $V_2S_5$; $Fe_{0.25}V_{0.75}S_{2a}$; $V_{0.25}S_2$; $Cr_{0.5}V_{0.5}S_2$; $Cr_{0.75}V_{0.25}S_2$; $Cr_5V_{0.5}S_2$; $NbS_3$; $NiPS_3$; FeOCl; $UO_2F_2$; $NbSe_3$; $MoS_3$; CuS; $Cr_3O_8$; $V_6O_{13}$ (stoichiometric); $V_6O_{13}$ (non-stoichiometric); $TaS_2$; $MoS_2$; $MoSe_2$; $WS_2$; and $WSe_2$.

3. A rechargeable solid-state lithium conducting solid polymer electrolyte electrochemical cell according to claim 2 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and LiCl, and said solid polymer is selected from the group consisting of: poly(ethylene oxide); poly(ethylene oxide)/poly(ehtylene glycol) mixtures; and polyphosphazene.

4. A rechargeable solid-state lithium conducting solid polymer electrolyte electrochemical cell according to claim 3 which is hermetically sealed from the atmosphere.

5. A rechargeable solid-state lithium conducting solid polymer electrolyte electrochemical cell according to claim 1 which is hermetically sealed from the atmosphere.

6. A rechargeable solid-state lithium conducting solid polymer electrolyte electrochemical cell according to claim 1 wherein said lithium intercalation compound negative electrode comprises $WO_2$ in a dispersion with an agent selected from the group consisting of: poly(ethylene oxide); graphite and poly(ethylene oxide); and Teflon.

7. A rechargeable solid-state lithium conducting solid polymer electrolyte electrochemical cell according to claim 2 wherein said lithium intercalation compound comprises $TiS_2$ in a dispersion with an agent selected from the group consisting of: poly(ethylene oxide); graphite and poly(ethylene oxide); and Teflon.

8. A rechargeable solid-state lithium conducting solid polymer electrolyte electrochemical cell according to claim 1 wherein said lithium ion conducting supporting electrolyte is selected from the group consisting of: $LiCF_3SO_3$; $LiAsF_6$; $LiClO_4$; $LiAlCl_4$; $LiGaCl_4$; $LiBF_4$; and LiCl, and said solid polymer is selected from the group consisting of: poly(ethylene oxide); poly(ethylene oxide)/poly(ehtylene glycol) mixtures; and polyphosphazene.

9. A rechargeable solid-state lithium conducting solid polymer electrolyte electrochemical cell according to claim 1 wherein said negative electrode comprises lithium intercalated $WO_2$, said polymer electrolyte comprises poly(ethylene oxide) and $LiCF_3SO_3$, and said positive electrode comprises $TiS_2$.

10. A rechargeable solid-state lithium conducting solid polymer electrolyte electrochemical cell according to claim 1 wherein said negative electrode comprises lithium intercalated $WO_2$, said solid polymer electrolyte comprises poly(ethylene oxide)/poly(ethylene glycol) mixture and $LiCF_3SO_3$, and said positive electrode comprises $TiS_2$.

11. A rechargeable solid-state lithium conducting solid polymer electrolyte electrochemical cell according to claim 1 wherein said negative electrode comprises lithium intercalated $WO_2$, said solid polymer electrolyte comprises polyphasphazene and $LiCF_3SO_3$, and said positive electrode comprises $TiS_2$.

12. A rechargeable solid-state sodium ion conducting solid polymer electrolyte electrochemical cell comprising:

a sodium intercalation compound negative electrode having homogeneous matrix of transition metal ion doped beta"-alumina;

a sodium ion conducting solid polymer electrolyte comprising a sodium ion conducting supporting electrolyte complexed with a solid polymer contacting said negative electrode on one side; and a sodium intercalation compound positive electrode having homogeneous matrix of transition metal ion doped beta"-alumina contacting the opposite side of said solid polymer electrolyte.

13. A rechargeable solid-state sodium ion conducting solid polymer electrolyte electrochemical cell according to claim 12 wherein said positive electrode comprises $Na_{1.66}Mg_{0.67}Al_{10.33-y}M_yO_{17}$ and said negative electrode is selected from the group consisting of $Na_{1.68}Li_{0.32}Al_{10.41-y}M_yO_{18}$ and $Na_{1.81}Li_{0.32}Al_{10.33-y}M_yO_{18}$, where M is selected from the group consisting of $Cr^{2+}$, $Cr^{3+}$, $Fe^{2+}$, and $Fe^{3+}$ whereby y is about 0.1 to about 0.65.

14. A rechargeable solid-state sodium ion conducting solid polymer electrolyte electrochemical cell according to claim 13 wherein said sodium ion conducting supporting electrolyte is selected from the group consisting of $NaCF_3SO_3$; $NaAlCl_4$; and $NaClO_4$; and said solid polymer is selected from the group consisting of: poly(ethylene oxide); poly(ethylene oxide/poly(ethyene glycol) mixtures; and polyphosphazene.

15. A rechargeable solid-state sodium ion conducting solid polymer electrolyte electrochemical cell according to claim 14 which is hermetically sealed from the atmosphere.

16. A rechargeable solid-state sodium ion conducting solid polymer electrolyte electrochemical cell according to claim 12 hermetically sealed from the atmosphere.

17. A rechargeable solid-state sodium ion conducting solid polymer electrolyte electrochemical cell according to claim 12 wherein said sodium ion conducting supporting electrolyte is selected from the group consisting of NaCF$_3$SO$_3$; NaAlClhd 4; and NaClO$_4$; and said solid polymer is selected from the group consisting of: poly(ethylene oxide); poly(ethylene oxide/poly(ethyelene glycol) mixtures; and polyphosphazene.

18. A rechargeable solid-state sodium ion conducting solid polymer electrolyte electrochemical cell according to claim 12 wherein said negative electrode comprises Na$_{1.81}$Li$_{0.32}$Al$_{10.33-y}$Cr$_y$O$_{18}$, said solid polymer electrolyte comprises polyphosphazene, NaCF$_3$SO$_3$, and said positive electrode comprises Na$_{1.66}$Mg$_{0.67}$Al$_{10.33-y}$Fe$_y$O$_{17}$ wherein y is about 0.1 to about 0.65.

19. A rechargeable solid-state sodium ion conducting solid polymer electrolyte electrochemical cell according to claim 12 wherein said negative electrode comprises Na$_{1.81}$Li$_{0.32}$Al$_{10.33-y}$Cr$_y$O$_{18}$, said solid polymer electrolyte comprises poly(ethylene oxide) and NaCF$_3$SO$_3$, and said positive electrode comprises Na$_{1.66}$Mg$_{0.67}$Al$_{10.33-y}$Fe$_y$O$_{17}$ wherein y is about 0.1 to about 0.65.

20. A rechargeable solid-state sodium ion conducting solid polymer electrolyte electrochemical cell according to claim 12 wherein said negative electrode comprises Na$_{1.81}$Li$_{0.32}$Al$_{10.33-y}$Cr$_y$O$_{18}$, said solid polymer electrolyte comprises poly(ethylene oxide)/poly(ethylene glycol) mixture and NaCF$_3$SO$_3$, and said positive electrode comprises Na$_{1.66}$Mg$_{0.67}$Al$_{10.33-y}$Fe$_y$O$_{17}$ wherein y is about 0.1 to about 0.65.

21. A rechargeable solid-state sodium ion conducting solid polymer electrolyte electrochemical cell according to claim 12 wherein said transition metal is selected from the group consisting of chromium and iron.

22. A rechargeable solid-state sodium ion conducting solid polymer electrolyte electrochemical cell according to claim 12 wherein said alumina is stabilized by a material selected from the group consisting of magnesium and lithium.

* * * * *